United States Patent [19]
Pall et al.

[11] Patent Number: 4,902,420
[45] Date of Patent: Feb. 20, 1990

[54] SEGMENTED FILTER DISC WITH SLOTTED SUPPORT AND DRAINAGE PLATE AND SUPPORT SPACER

[75] Inventors: David B. Pall, Roslyn Estates; John D. Miller, Ithaca, both of N.Y.

[73] Assignee: Pall Corporation, Glen Cove, N.Y.

[21] Appl. No.: 325,002

[22] Filed: Mar. 17, 1989

Related U.S. Application Data

[63] Continuation of Ser. No. 30,576, Mar. 27, 1987, abandoned.

[51] Int. Cl.$^4$ .................................. B01D 29/16
[52] U.S. Cl. .................................. 210/346; 210/486; 210/498; 210/510.1; 55/501; 55/523
[58] Field of Search ............... 210/314, 331, 346, 347, 210/486, 487, 498, 510.1; 55/482, 485, 523, 501

[56] References Cited

U.S. PATENT DOCUMENTS

| | | | |
|---|---|---|---|
| 1,036,174 | 8/1912 | Barnes | 210/347 |
| 1,227,983 | 4/1917 | Vallez | 210/487 |
| 2,084,753 | 8/1935 | Watson et al. | 210/195 |
| 2,444,147 | 6/1948 | Walton | 210/486 |
| 2,448,930 | 9/1948 | Stokes | 210/486 |
| 2,591,056 | 4/1952 | Ericson | 210/486 |
| 2,654,440 | 10/1953 | Robinson | 210/486 |
| 2,813,632 | 11/1957 | Muller | 210/486 |
| 3,209,915 | 6/1962 | Gutkowski | 210/347 |
| 3,261,474 | 7/1966 | Parker et al. | 210/487 |
| 3,294,242 | 12/1966 | Notari | 210/347 |
| 3,398,833 | 8/1968 | Marks et al. | 210/321 |
| 3,398,834 | 8/1968 | Nuttall et al. | 210/346 |
| 3,477,582 | 11/1969 | Baldwin | 210/232 |
| 3,512,647 | 5/1970 | Young | 210/169 |
| 3,647,084 | 3/1972 | Martin | 210/492 |
| 3,648,844 | 3/1972 | Krynski et al. | 210/331 |
| 3,702,659 | 11/1972 | Clark | 210/486 |
| 4,501,663 | 2/1985 | Merrill | 210/347 |
| 4,637,876 | 1/1987 | Dosoudil | 210/331 |
| 4,637,877 | 1/1987 | Hartmann et al. | 210/347 |
| 4,683,060 | 7/1987 | Drori | 210/448 |

FOREIGN PATENT DOCUMENTS

| | | |
|---|---|---|
| 10146 | 3/1956 | Fed. Rep. of Germany . |
| 1833233 | 6/1961 | Fed. Rep. of Germany . |
| 1116193 | 5/1962 | Fed. Rep. of Germany . |
| 1436242 | 2/1963 | Fed. Rep. of Germany . |
| 2429480 | 2/1975 | Fed. Rep. of Germany . |
| 951404 | 8/1960 | United Kingdom . |
| 966683 | 8/1964 | United Kingdom . |

Primary Examiner—Richard V. Fisher
Assistant Examiner—Wanda L. Millard
Attorney, Agent, or Firm—Leydig, Voit & Mayer

[57] ABSTRACT

A filter segment disc of a segment filter comprises a support and drainage plate with slots radiating from the filter hub toward the filter edge. The slots are preferably of arcuate plan form and configured to provide a substantially uniform fluid flow over the filtering medium of the filter segment, reduce residence time of filtrate in the filter, eliminate dead spots in the flow, and facilitate cleaning of permanent filters. A filter support spacer may be provided adjacent the filtering surface to aid in support and positive spacing of the disc in a filter stack of which the disc may be an element.

26 Claims, 3 Drawing Sheets

SEGMENTED FILTER DISC WITH SLOTTED SUPPORT AND DRAINAGE PLATE AND SUPPORT SPACER

This application is a continuation of application Ser. No. 07/030,576, filed on Mar. 27, 1987, now abandoned.

TECHNICAL FIELD

The present invention relates to disc type segmented filters. These filters may be used in various industrial applications where pressure drop over the filter media is high relative to the flexural strength of the media. In particular, these filters are used where very viscous material, such as, for example, molten polymers, must be filtered or where thin membrane filter media are used, as, for example, in semiconductor manufacturing.

BACKGROUND OF THE INVENTION

Conventional segment-type filter units comprise an assembly of two or more individual disc segments stacked at their respective hubs on a central common filtrate collection tube within a filter housing. Each filter segment is made up of a central coarse drainage and support mesh sandwiched between layers of filtration and support media and has its filtering surfaces spaced from those of the adjacent filter segments to allow inflow of the fluid to be filtered. Generally, the assembled segment filter unit is enclosed within a housing which is supplied with fluid at a relatively high pressure while the central collection tube is maintained at a lower pressure so that fluid flows from the housing through the filtering surface and exits through the central collection tubes.

Each of the filter segments typically comprises a filtration medium affixed to the surface of a filter support and drainage core which is usually composed of a woven, screen-like wire mesh. The filtration medium may comprise any of many well-known materials, for example, a sintered powdered metal material, sintered fiber metal, finely woven metal or synthetic materials, or polymer membranes. The filter core generally serves the purposes of stiffening the disc, supporting the filtration medium, and providing a porous interior through which the filtrate can drain to the hub after passing through the filtration medium. Alternatively, the filter core may be composed of a porous matrix positively formed by the layering of plates, as described in U.S. Pat. No. 3,702,659 to Raymond C. Clark. The porosity of the core in either case will generally be uniform throughout the interior of the filter segment. Thus, in conventional filter segments during the filtration process, the initial flow velocity through the filtration medium is not uniform over the surface of the filter segments but rather is higher at points closer to the hub than at points more distant from the hub.

As is known by those familiar with the art, non-uniform flow velocity through the filtration medium results in a shorter filter segment life than could be obtained if a uniform flow velocity were maintained at all times over the entire filtering surface, necessitating more frequent removal and cleaning of the filter. Non-uniform flow velocity through the filtration medium also results in a higher residence time, or hold-up time, of some of the filtrate in the segment. This is of particular concern in polymer melt filtration applications, as most polymers experience molecular weight shifts due either to polymerization or degradation when subject to high temperatures. Non-uniformity of residence time will generally result in a lower quality product containing a large range of molecular weights and poorly suited for many manufacturing applications. In some cases, molecular weight can be reduced by 50% in one minute.. Where the polymer is prone to cross-linking during exposure to high temperature, increased holdup time can result in the formation of undesirable gels which are very harmful where the polymer resin filtrate is to be cast, or extruded, or blown into fiber, causing optical defects and fiber breakage.

Another important consideration in the design of filter segments is the elimination of "dead spots", or areas of stagnation, where filter fluid, especially polymer melt, can stagnate and decompose during extended exposure to high temperature. In the above reference by Clark, the porous matrix formed by the layering of plates offers opportunities for stagnation in crevices between the layered plates and at the extremities of the apertures of the plates. Such areas of stagnation also interfere with cleaning of the segment to allow repeated use of the filter discs before they must finally be discarded. Areas of stagnation resist penetration of cleaning agents. In polymeric applications, any degraded polymer retained in dead spots after cleaning can catalyze cross-linking and formation of gels when the segment is put back in use.

The importance of minimizing the volume of the flow channels in the filter segments while keeping the pressure drop low is clear. The equations which describe the flow of fluids through channels such as those of the Clark structure, which was discussed in detail beginning at page 18 of this specification, show that pressure drop along the channels varies inversely as the cube of the channel depth. Thus, replacement of the four apertured plates with two parallel paths of flow by a single plate of fourfold thickness will decrease pressure drop by a factor of 32. Such reductions in clean filter disc pressure drop allow greater utilization of the dirt capacity of the filter media without having to go to extremely high changeout pressures, such as 10,000 psi.

Additional problems have been experienced with conventional segment filters when operating under conditions of high pressure, for example, pressures in excess of 1,800 psi. These problems result from distortion of the filtration medium matrix caused by inadequate support of the filtering medium, as explained in the above reference by Clark. Thus, a tradeoff must be made in selecting the core material for a conventional segment filter to provide a core material that has sufficient flow capacity and minimizes internal pressure drop within the filter segment, yet has sufficient rigidity to prevent distortion of the filtration medium. Segment-type disc filters are often exposed to extremely high stresses which can cause permanent distortion of the discs. These stresses result from high pressure drops developed when high viscosity polymer melt flows into the annular spaces between adjacent discs. The pressure drop for flows between parallel plates is inversely proportional to the spacing between plates. Thus a small difference in spacing on opposite sides of a disc can result in significant difference in pressure drop. In practice, variations in disc spacing from nominal may result in pressure differences causing a total force over a disc as great as 1,000 pounds.

To provide additional support to the individual segments of the filter stack and minimize possible distortion of the filter medium matrix, spacers consisting of a hub concentric with those of the filter segments and with radial arms extending outward to the outside diameter of the disc have been used to allow the discs to support one another. Other approaches use a coarse wire mesh between adjacent segments to accomplish this purpose.

In segment designs where a coarse drainage support mesh is sandwiched between identical layers of filtration and support media, edgewise flow through the drainage mesh constitutes a significant resistance to the flow. This high resistance further broadens the range of flow velocities over the segment surface, which adversely affects the dirt capacity of the filter, as discussed above.

Thus, in the design of conventional filter segments, the choice of a supporting mesh is complicated by the conflicting requirements of adequate filtrate drainage through the filter disc and adequate stiffness and integrity, which favor the choice of a coarser mesh, and the requirements of adequate support for the filtration medium and the minimization of the overall thickness of the segment filter discs to allow efficient use of the filter housing space, which encourage the choice of a fine mesh. Conventional filters have utilized a composite of two or more woven wire meshes to achieve both maximum fluid drainage and maximum filtration medium support. Typically, these filters comprise a protective mesh, an exterior filtration medium, a fine mesh support medium, a perforated metal beneath that fine mesh with an open area of about 30–50% to support the mesh and filtering medium, and a core of coarse mesh, typically of 8 to 10 wires per inch, to provide for lateral drainage of the filtrate.

Schemes have been developed to improve the drainage of segment filter discs over that afforded by use of simple wire mesh both to provide drainage and to serve as support for the filtration medium. Such a scheme is described in U.S. Pat. No. 3,702,659 to Raymond C. Clark. However, the benefits of increased drainage area in Clark's concept are accompanied by the high hydraulic area of the apertures in the plurality of discs used to form the segment core of his invention, as well as by the tortuous path the filtrate must travel in passing through that core to get to the segment filter hub. As discussed above, the high hydraulic area of the four apertured plates increases pressure drop by a factor of 32 over that of a single plate. If, alternatively, the four plates are made thick enough to keep the pressure drop within reasonable limits, the resulting increase in the overall thickness of the filter disc will decrease the number of filter segments which can be fitted into a given housing. In polymer melt applications, as discussed above, the matrix formed by such layering of plates offers opportunities for stagnation points in the molten polymer flow and the formation of undesirable gels. These dead spots also interfere with cleaning of the filter segments.

Problems similar to those of high pressure applications may also be experienced in low pressure applications where, for example, membrane filters are used for fine filtration in, as an example, semiconductor wafer manufacturing. As flow density is a function of pore size, large numbers of filter segments are stacked in close proximity to one another to provide the requisitely large filter area in sub-micron filter applications to obtain sufficient flow volumes with low flow densities. A further advantage of utilizing the stack-type filter as opposed to pleated fabric supported filters to attain these large filtering surfaces is the absence of woven or nonwoven supports which might otherwise result in increased air hold-up. Pleated fabric-supported filters utilize fine fiber fabrics of high fiber density to provide adequate support to the thin, low flexural strength filtration media. However, the finer the fiber, the more prone it is to air hold-up and the harder it is to remove trapped air. Air hold-up tends to increase with the fiber surface area of the fabric which is inherently high in fine fiber fabrics of high fiber density. Entrapment of air can be a cause of contamination in certain applications, such as photoresist dispensing, where alternate expansion and contraction of air during successive filtrate dispense cycles can result in loss of control of amounts of photoresist being dispensed.

When membrane materials, such as, for example, Teflon and other polymers, are used for fine filtration, for example, one micron or lower, they must be very thin to keep the pressure drop reasonably low for a given flow rate. These thin membrane materials have a low flexural strength which decreases further with increases in temperature and concomitant decreases in modulus of elasticity of the material. Thus, it is very important to provide adequate support to the membrane to prevent its collapse under the operating pressure while still providing adequate means for drainage of the filtrate and minimizing air entrapment. Devices have been suggested to provide these functions, such as that described in U.S. Pat. No. 4,501,663 by Merrill. In that device, support and drainage are provided by circular channels, concentric about the disc center, which are drained to the central outlet through a number of radial slots. The relatively large distance filtrate must travel along the annular channel before reaching a slot in the areas most distant from the hub results in a greater pressure drop than in a system with more optimized flow distribution. Flow distribution considerations are especially critical in low viscosity fluids, such as, for example, gas flow applications.

DISCLOSURE OF THE INVENTION

In the present invention, a single slotted plate is utilized in the core of the filter segment disc to serve the dual purpose of providing support to the filtering media and a clean and direct drainage path for the filtrate to flow to the hub area. A drainage means is provided on each side of the plate to allow filtrate to migrate to the channels formed by the core plate slots. With the aid of a computer model, the slot width distribution and centerline configuration can be optimized to provide substantially uniform flow through the filtration medium and minimize polymer residence time in the filter disc. For high pressure applications, a support spacer with arcuate arms extending in a generally radial direction and of a radius similar to that of the slots, but curved in a direction opposite that of the slots, may be utilized between adjacent filter discs. Curvature of the arms in a direction opposite that of the slots not only increases filter disc stiffness but also minimizes possible blockage of the slots in the support spacer.

It is an object of the present invention to provide a filter segment which has a low flow resistance, is free of stagnation points, and minimizes opportunities for air entrapment, yet provides good support for the filtration medium, even at very high operating pressures or where a membrane filtering medium of very low flexural strength is used. It is also an object of the present invention to provide a filter segment which can be designed to provide a substantially uniform flow through all points on the surface of the filtration medium to maximize dirt-holding capacity of the filter. With the present invention, the hydraulic area may be kept to a minimum while providing a low overall filter disc thickness. Because flow paths are kept direct and clear of obstructions, the present invention further provides for ease of cleaning of the filter.

The utilization of the slotted core plate of the present invention provides higher flow rates for a given pressure drop than a conventional filter segment disc or, alternatively, a lower pressure drop for a given volume flow rate than may be obtained with such a conventional filter segment disc. Further, by appropriate design of the core plate slots, a substantially uniform flow velocity over the filtration medium surface of the segment can be obtained, unlike that of a conventional segment. This results in a higher dirt capacity than in the case of the conventional segment. Use of the curved member support spacer of the present invention allows further enhancement of these advantages while providing support to the individual disc filters and minimizing possible blockage of the support plate slots.

Utilization of the slotted core plate of the present invention allows the use of filter discs of reduced thickness, in turn allowing more filter disc and, thus, more filtration area, to be packed within a given housing.

Other objects, advantages, and aspects of the invention will become apparent upon reading of the following detailed description and appended claims and upon reference to the accompanying drawings.

BEST MODE FOR CARRYING OUT THE INVENTION

Figure 1:
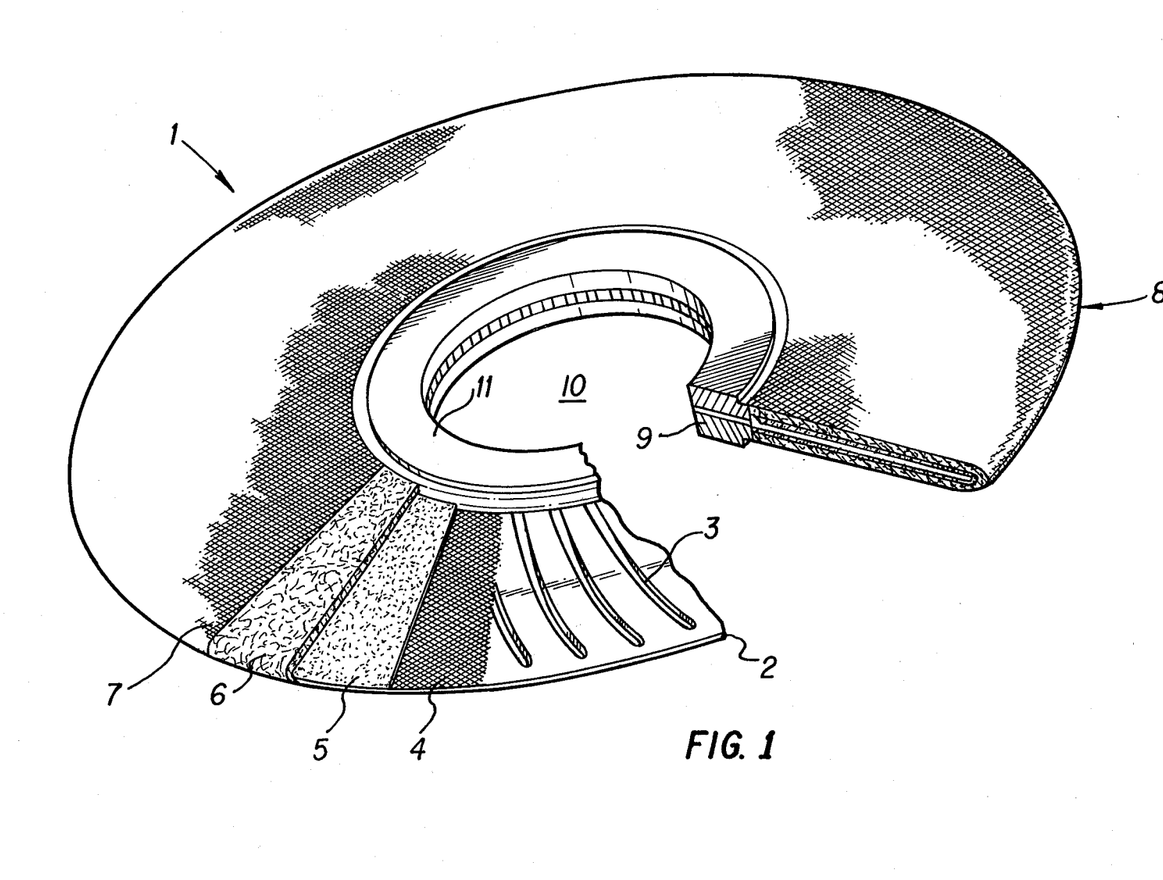
FIG. 1 is a cutaway perspective view of a filter segment disc comprising the slotted support and the drainage plate of the present invention.

In accordance with the invention, an exemplary filter segment disc is illustrated in FIG. 1. The exemplary filter segment disc 1 is constructed with a central support and drainage plate 2 having a central orifice 10 and generally radially oriented slots 3. A drainage mesh 4 is provided on both the upper and lower sides of the drainage and support plate 1 and supports the filter medium 5, 6 which is comprised of an inner layer consisting of a porous metal membrane 5 and an outer layer comprised of a porous metal fiber 6. In this exemplary embodiment, the upper and lower exterior surfaces of the segment are provided with a protective mesh 7. The upper and lower filter media, composed of the porous metal membrane 5 and porous metal fiber 6, are sealed to one another at the outer edge of a disc 8 by a welded bead. A split hub is formed of two annular portions 9 located above and below the support and drainage plate 2, which surround the orifice 10 formed in the center of the plate. The filtering media 6, 5 are sealed to the outer portion of the hub pieces 9 by a welded bead. The hub portions 9 are formed with a raised flat surface 11 so that, when several filter segment disc elements 1 are stacked with the flat surfaces 11 of the hubs of adjacent segments in contact, and held in alignment by a central drainage tube or similar locating device (not shown), the surfaces of the filtering media of adjacent filter segment discs 1 are spaced from one another. During a filtering operation, once several filter segment discs 1 are stacked on the central drainage tube and placed in a filter housing (not shown), the fluid to be filtered is introduced into the housing at a high pressure and a lower pressure is maintained in the drainage tube so that the fluid passes through the protective outer mesh 7, porous metal fiber 6 and porous metal membrane 5 and into the drainage mesh 4. The filtrate then migrates through the drainage mesh 4 to the nearest filter core plate slot 3 through which it can flow, without obstruction, to the central orifice 10 where it enters the drainage tube to pass from the filter unit. While the exemplary filter segment disc of FIG. 1 is shown to be of circular plan form, the filter segment disc 1 may be made in any practical shape, for instance, elliptical or polygonal. The diameter of such a disc made in circular plan form may be made of any convenient magnitude, including the most commonly used industrial sizes of 7, 8¾, 10, and 12 inch outer diameters. Such filter segment discs have predominantly been made in the standard 7 inch and 12 inch sizes. Terminal pressure differentials over the filter in industrial operations involving, for example, the filtration of molten polymers, generally range from 800 psi to over 5,000 psi. In membrane filtration applications, pressure differentials will be much lower, for example, in semiconductor manufacturing applications, on the order of 100 psi and lower. In filtering operations where a constant volume flow is maintained, the formation of a filter cake by impurities removed from the liquid being filtered will cause the pressure differential across the filter to raise from an initial lower value to higher values over time until a practical limit is reached. The filter segments are then removed and cleaned for reuse.

In the exemplary embodiment, the slotted support and drainage plate 2 is of a circular plan form having a center orifice 10 and slots 3 in communication with central orifice 10 and extending from orifice 10 toward the outer edge 8 of the plate 2. While the slot widths and centerlines may be of any convenient configuration, it is preferable that they be formed to maximize filter performance by creating a substantially uniform pressure differential over the filtering medium 5, 6, thus maintaining a uniform fluid flow over the filtering surface of the filter segment 1. To achieve this preferred maximized filter performance, both the local angle between the slot centerline and the local radius extending from the center of the core plate, and the local slot width may be varied as a function of the distance along the slot 3 from the central orifice 10. The slotted plate may be fabricated by a molding or casting process or machined from flat plate material and may consist of a number of cooperative elements.

A preferred slot configuration may be determined by the application of well-known equations of fluid flow utilizing parameters of the filtering medium 5, 6 and drainage mesh 4 together with properties of the fluid to be filtered in a numerical computer program in a trial and error interative process to ascertain desired optimum filter performance characteristics. In this optimization process, the ratio of drainage slot area to local filtering medium surface area within a narrow circumferential element at a given distance from the filter segment center may be increased by increasing the local width of the slot 3, increasing the angle between the slot centerline and the local radius of the filter segment, or increasing the number of slots.

Figure 4:
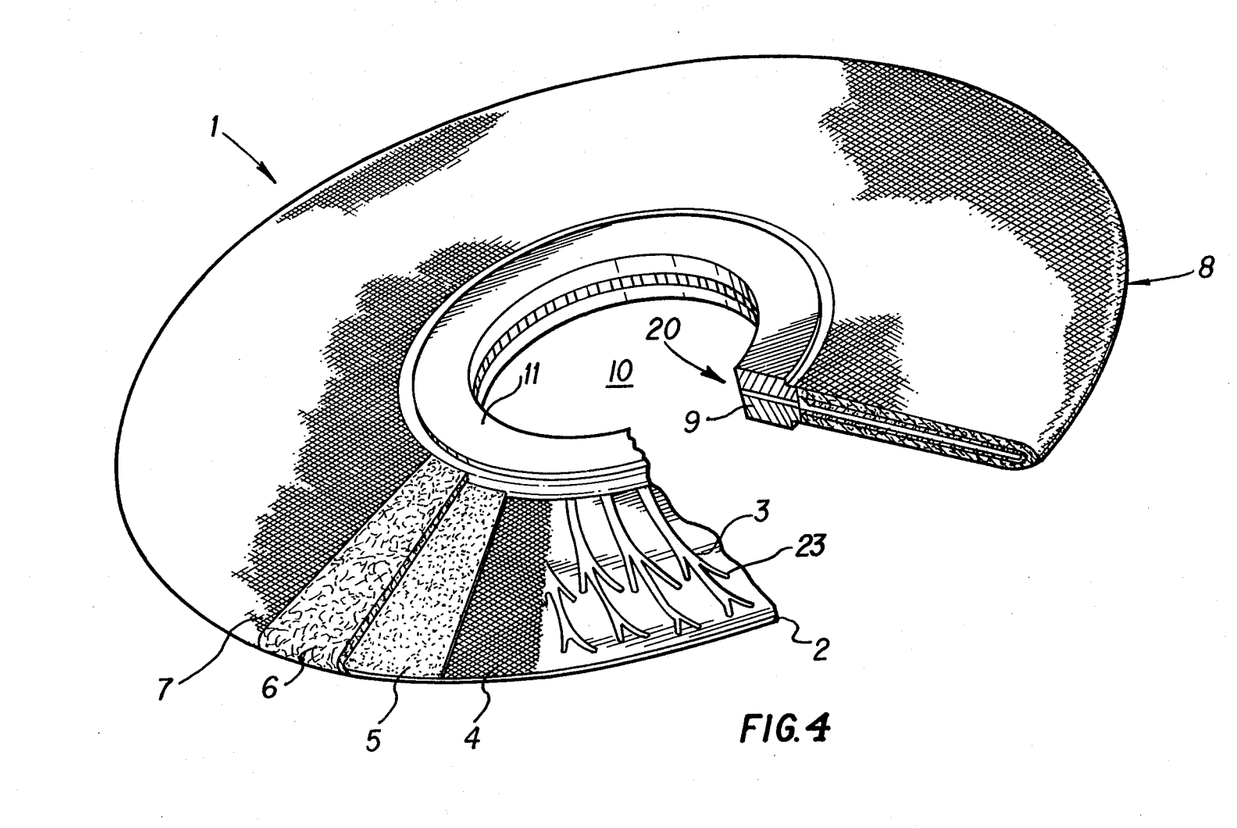
FIG. 4 is a cutaway perspective view of a fourth embodiment of the filter segment disc of the present invention comprising slots which branch into a greater number of slots as they extend toward the outer edge of the support plate.

In the illustration of the preferred embodiment of FIG. 1, the slots 3 are shown to be of constant cross section and arcuate plan form, and separated by an angle of approximately 9° at their point of interception with the plate orifice 10. Generally, as in the exemplary embodiment, the width of the slots 3 will be maintained constant to simplify the fabrication process, and the slots 3 will thus be arcuate in plan form to achieve a more optimum uniform pressure distribution over the filtering medium surface. The slots 3 may be of a greater or smaller number than in the illustration. They may extend linearly in a generally radial direction and may have a varying width along their length, if desired. In an alternative embodiment, as shown in FIG. 4, the slots 3 may branch into a greater number of slots 23 as they extend toward the outer edge of the support plate. The slotted plate 2 of the exemplary embodiment may be fabricated from a metallic material, such as stainless steel, ceramic material, plastic, or any other material of suitable stiffness and other properties, and which is compatible with the fluid to be filtered. The general and local thickness of the plate may vary, but its effect on the local flow area of the slots, as defined by the plate thickness and slot width, must be taken into account in determining optimal slot width distribution.

A means for allowing the filtrate to drain from the filtration medium, a drainage mesh 4 in the case of the exemplary embodiment of FIG. 1, is provided at the upper and lower surfaces of the slotted plate 2. A drainage means, such as this layer of drainage mesh 4, is necessary for proper performance of the exemplary filter segment 1 to allow the filtrate to flow from the low pressure side of the filtering medium 5, 6 in an edgewise direction to reach the channels formed by the slots 3 in the slotted plate 2. The drainage mesh 4 may consist of any material compatible with the fluid to be filtered, sufficiently porous to allow the filtrate to readily flow to the slots 3 and of sufficient strength to support the filtering media 5, 6, for example, a woven metal of a fineness of 30×30 strands per inch with a wire diameter of 0.016 inch and a thickness of approximately 0.032 inch. The drainage means may also be formed of coarse metal fiber sintered to produce a fiber medium of the desired drainage and support characteristics. As an example, fibers with a diameter in the range of 0.001 to 0.016 inch can be used. Generally, they should be precut to suitable length but can be continuous if air laid. One preferred form of fiber drainage medium might be sintered from fiber 0.5 to 1.0 inch long and wire diameter of 0.004 to 0.012 inch to produce a fiber drainage medium of 0.030 inch thickness.

Figure 2:
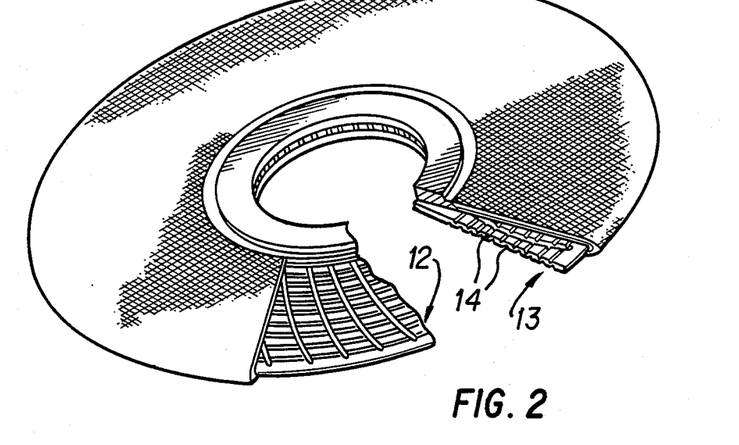
FIG. 2 is a cutaway perspective view of a second embodiment of the filter segment of the present invention comprising a slotted support and drainage plate with a grooved surface.

The drainage and support means may also comprise texturing or grooving of the plate surface. In a second embodiment of the present invention shown in FIG. 2, grooves 14 are formed in both surfaces 12, 13 of the slotted support and drainage plate 2 to provide passages through which the filtrate can flow from the low pressure side of the filtering medium 5, 6 to the channels formed by the slots 3. Thus, the support and drainage plate serves not only as a supporting means for the filter medium, but also provides a drainage means from the filter medium to the slot channels and the means of drainage to the hub. As an example, drainage characteristics similar to those provided by a woven metal mesh of a fineness of 30×30 strands per inch with a wire diameter of 0.016 inch can be obtained with a grooved plate by providing twenty-two grooves, each 0.010 inch deep and 0.030 wide, over each inch along the plate radius. The grooves 14 can easily be machined on the plate surface 12, 13 or, where the plate is formed of plastic or other moldable material, formed during a plate-molding process. The grooves may be in the form of concentric circles or made in a continuous spiral pattern. In the case of a metallic plate, spiral form grooves may be provided by laying a spirally-formed wire over the plate and bonding the assembly, for example, by sintering. Grooved metallic plates might be used as the support and drainage means in segment filters incorporating, for example, a porous stainless steel filtering medium such as is manufactured by Pall Corporation and marketed under the Trademark PSS. The grooved, metallic support and drainage plates described above would be especially suited to high pressure applications, such as polymer melt filtration.

In the exemplary embodiment of FIG. 1, the filtering medium 5, 6 consists of two layers, an inner layer 5, consisting of a porous metal membrane, and an outer layer 6, consisting of a porous metal fiber. As an example, the porous metal membrane may be of a pore rating consistent with the application, typically not less than the pore rating of the porous metal fiber. For application to molten polymer filtration, the porous metal fiber may typically have an absolute pore rating of from about 1 to 60 micrometers. The porous metal membrane 5 is utilized beneath the porous metal fiber 6 in the exemplary filter segment 1 to provide the flattest possible supporting surface beneath the metal fiber 6 to prevent distortion or failure of the porous metal fiber filtering layer and assures the maintenance of high filtration efficiency should the porous metal fiber be damaged. Alternatively, a fine woven metal cloth may be substituted or this layer may be eliminated, depending upon expected operating conditions.

It should be noted that any filtering medium suitable to a particular application may be substituted for the porous metal fiber 6 and porous metal membrane 5 of the exemplary filter segment disc 1. For example, a sintered particulate porous stainless steel medium, such as marketed by Pall Corporation under the trademark PSS, may be used. Where corrosive elements are to be removed by filtration, a ceramic filtration medium may be preferred. A tapered filtering medium with a graded pore size outer section and a constant pore size inner portion may be used to provide longer filter segment life. A continuously graded pore size outer section would be most desirable. For some low pressure applications, membrane filtering material, such as, for example, Teflon or other polymer, may be used.

In the exemplary filter segment of FIG. 1 a protective outer mesh 7 is provided to prevent abrasion of the porous metal fiber 6 of the filtering medium 5, 6 during handling of the filter segment 1. A fiber medium formed of sintered coarse metal fibers, similar to that described above for use in the drainage layer but only 0.010 inch thick, for example, can be used as an upstream protective medium for fiber metal filters instead of a wire mesh. The presence of protective outer mesh 7 is not essential to the filtering function of the filter disc 1.

In the exemplary filter segment of FIG. 1, the disc is sealed at its outer edge 8 by a welded bead which joins the upper and lower porous metal membranes 5, porous metal fiber layers 6 and outer protective meshes 7. The filtering layers 5, 6 and the protective meshes 7 are then welded to the hub sections 9. The entire filter segment disc 1 is held together in fixed relation by these welds and further by the exterior pressure within the filter housing during the filtration process.

Figure 3:
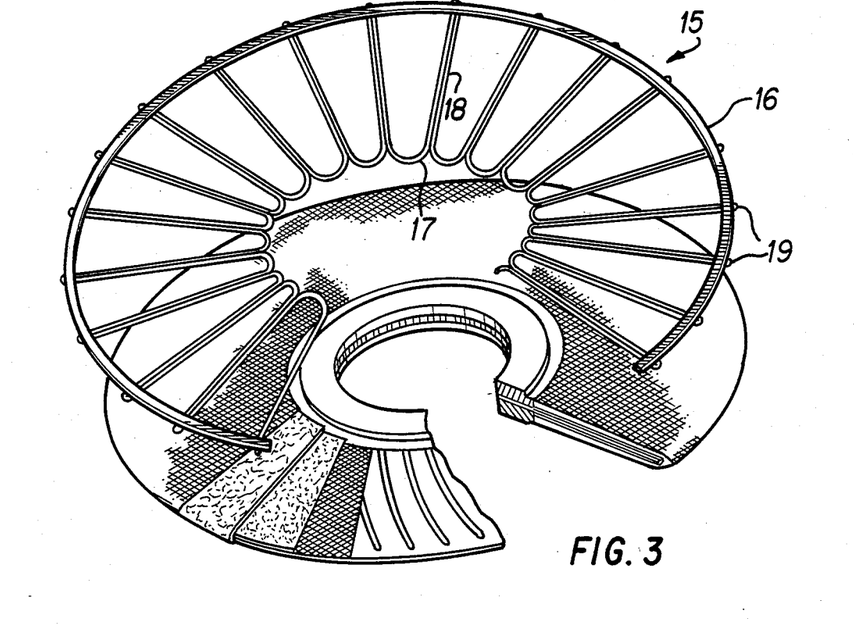
FIG. 3 is a cutaway perspective view of a third embodiment of the filter segment disc of the present invention comprising a support plate and support spacer.

A third exemplary embodiment of the present invention is shown in FIG. 3. This embodiment comprises an external support spacer 15 and is particularly suitable for high pressure applications where distortion of the filtering medium is of greatest concern and it is desired to link the disc elements of the stack to one another to provide additional support to the individual elements and increase rigidity of the stack. This embodiment comprises an external support spacer 15 which lies in contact with the protective mesh 7 of the segment filter 8 and, when the disc segments are stacked on a common hub, also contacts the outer protective mesh of an adjacent disc. The support spacer comprises an outer ring member 16 and an inner positioning ring 17 which are joined by arcuate radial members 18. The arcuate radial members 18 are of an arc radius similar to that of the slots 3 of the slotted core drainage and support plate 2 but are of an opposing curvature to that of the slots 3 to minimize possible blockage of the core plate slots by the radial members when the filter stack is assembled. In the exemplary preferred embodiment of FIG. 3, the outer ring member 16 is made from, for example, a 0.035 inch thick by 0.125 inch wide flat wire. The arcuate radial members 18 and the inner positioning ring 17 are then formed from a single continuous 0.070 inch wire, bent sharply at the outside diameter to form the distal ends 19 of the radial arcuate members 18, and doubled back to form the radial arcuate member 18. The wire is bent in a series of loops between the arcuate members defining the circumference of the inner positioning ring 17. The sharply bent portions at the ends 19 of the radial arcuate members 18 at the outside diameter are flattened to 0.035 inch thickness and spot-welded to the outer ring member 16. When the filter segment disc 8 is stacked on a common hub with other disc elements, the support spacer provides support between adjacent disc filter elements.

An analytical, numerical computer model has been developed utilizing well-known equations of fluid flow for use in optimizing the central core slot configuration of the slots 3 in the central plate 2, as discussed above. In the computer model, flow through porous media and the drainage mesh is represented by the relation:

$$P1 = \frac{Q \cdot u \cdot KM}{A}$$

where,
P1 = media pressure drop, psi
Q = flow volume through media, milliliter/minute
u = viscosity, centipoise
KM = media resistance, psi minute/(ml, CP)
A = area of medium, square inch Edgewise flow through the drainage mesh to the channel created by the core plate slot is represented in the model by the relation:

$$P2 = \frac{Q \cdot u \cdot h \cdot KE}{b}$$

where,
P2 = edge flow pressure drop, psi
Q = edge flow volume through mesh, milliliter/minute
u = viscosity, centipoise
h = distance of edge flow, inch
KE = edge flow resistance, psi minute/(ml, CP)
b = width of channel of edge flow, inch For the model, flow within the channels created by the slots in the central plate is assumed to be governed by a parallel plate theory according to the relation:

$$P3 = 1.7688 \times 10^{-9} \frac{Q \cdot u \cdot l \cdot KS}{w \cdot h^3}$$

where,
P3 = slot flow pressure drop, psi
Q = flow volume through slot, milliliter/minute
u = viscosity, centipoise
l = length of slot, inch
w = width of slot, inch
h = depth of slot, inch
KS = slot resistance The residence time of fluid in the segment was calculated in the model using the relations:

$$T1(J,K) = A(J,K) \cdot b \cdot k / Q(J,K)$$

$$T2(K) = AS(K) \cdot W / Q(K)$$

where:
T1(J,K) = residence time of fluid in the J circumferential element bound by the K radial element between a pair of slots in the disc, minutes
A(J,K) area of the element for which the residence time T1(J,K) is being computed, square inch
b = thickness of support wire mesh, inch
k = % open area in the support wire mesh
Q(J,K) = flow volume through the element for which the residence time T1(J,K) is being computed, cubic inch/minute
T2(K) = residence time of the fluid in K radial element of a slot, minutes
AS(K) = area of the slot element for which the residence time T2(K) is being computed, square inch
W = width of slot, inch
Q(K) = flow volume through the slot element for which the residence time T2(K) is being computed, cubic inch/minute.

The model can be utilized in a computer program to study various possible configurations of slots for the core of a filter segment under given conditions. Performance curves are calculated and compared in an interative manner to obtain the optimum practical slot configuration for a contemplated application.

The model can also be utilized to compare the performance of a filter segment disc such as that of the exemplary embodiment of FIG. 1 with the performance of a standard filter segment disc not comprising the slotted central slotted drainage and support plate of the present invention. The performance of the exemplary filter was compared to that of a conventional filter segment under the assumption that a constant flow volume was maintained for the life of the filter segment, i.e., until the pressure differential required to maintain the flow volume reached a predetermined cut-off value. The computer model confirmed that generally lower differential pressures are required to initiate and maintain the flow of filtrate in the case of a filter segment disc utilizing the present invention as opposed to the conventional filter segment during the filtration process. Consequently, a longer period of filtration time is available before reaching the cut-off pressure differential at which it becomes impractical to continue the filtering operation when an embodiment of the present invention is utilized. This means a greater dirt load is achieved before cut-off in the case of the present invention, reflecting the greater filtering capacity for filter segments utilizing the slotted drainage and support plate construction. Computer simulations have indicated that, in some cases of high pressure filtration, the clean pressure drop of the slotted drainage support disc of the present invention is about 30% lower than that of the conventional mesh drainage disc filter segment. Further, the flow velocity over the filter segment surface may be made essentially uniform as compared with variations of up to 77% over the surface of conventional mesh drainage discs.

The model was used to study polymer melt applications and compare the residence time of polymer melts traveling from the farthest point of the slotted support drainage segment to its hub with that corresponding to the conventional mesh support drainage segment. It was found that the maximum residence time in the case of the slotted support drainage segment was half that when a conventional mesh support drainage segment was utilized. This is an important advantage where the polymer is prone to breakdown or cross-linking during extended exposure to high temperature and a high residence time may result in poor product quality and formation of gels.

The computer simulations have also demonstrated that the thickness of the filter segments may be reduced by use of the slotted drainage support disc of the present invention. As an example, in one instance, the 10×10×0.031 inch mesh, about 0.060 inch in thickness, used in a conventional 7 inch disc, may be replaced by a 0.048 inch thick slotted plate. This is a reduction of 0.012 inch in the typical 0.187 inch thickness of such a conventional 7 inch disc. This permits more discs and, consequently, more filtration area to be packed in a given housing.

While an exemplary filter segment embodying the present invention has been shown, it will be understood, of course, that the invention is not limited to that embodiment. Modification may be made by those skilled in the art, particularly in light of the foregoing teachings. For example, the slots of the center core plate may be made to extend linearly and radially from the central orifice and taper from a smaller to a larger width or from a larger to a smaller width as they extend outward. It is, therefore, contemplated by the appended claims to cover any such modification which incorporates the essential features of this invention or encompasses the true spirit and scope of the invention.

We claim:

1. A filter segment of a segment filter unit, having a central hub, an outer edge, and a filtering surface comprising:
   a drainage and support plate having an upper and a lower surface and formed with unobstructed and continuous slots passing through said plate from said upper surface to said lower surface and extending generally from the hub toward the outer edge of the filter segment, and increasing in cross-sectional area perpendicular to the radius with increasing distance from the hub so as to give substantially uniform flow through filtering media adjacent thereto,
   a filtering medium adjacent each of the upper and lower plate surfaces, and
   a means for acting in cooperation with the filter medium to provide drainage of a filtrate to the plate slots.

2. The filter segment of claim 1 in which said means for acting in cooperation with the filter medium comprises grooves in the surface of said drainage and support plate.

3. The filter segment of claim 2 in which the grooves appear as a spiral about the center of the plate in plan form.

4. The filter segment of claim 3 in which said grooves comprise a space formed by bonding of a continuous wire of spiral form upon the surface of the plate.

5. The filter segment of claim 2 in which the grooves appear as concentric circles about the center of the plate in plan form.

6. The filter segment of claim 1 further comprising a support spacer lying adjacent the filtering surface including an inner member surrounding the central hub, an outer member generally adjacent the outer edge, and a linking member joined to the inner member at a first end and joined to the outer member at a second end.

7. The filter segment of claim 6 in which said slots are arcuate in form and said spacer comprises a plurality of said linking members, each linking member including an arcuate portion of radius similar to that of the slots, said arcuate portions of said linking members curving in a direction opposite the curvature of the slots.

8. The filter segment of claim 7 in which said outer member is formed of flat wire, and said inner member and said linking members are formed of a single continuous wire, the wire bent sharply at the second end of each linking member to lie parallel to itself and form the arc portion of the linking member of two wire widths, said sharply bent portion flattened and joined to a flat side of said outer member.

9. The filter segment of claim 6 further comprising a protective layer between said support spacer and the filtering surface.

10. A filter segment as in claim 1 wherein the centerlines of the slots are arcuate in plan form.

11. A filter as in claim 10 wherein the slots are of constant width.

12. A filter segment as in claim 1 wherein the centerlines of the slots are straight in plan form and the width of the slots increases with radial distance from the hub.

13. A filter segment of a segment filter unit, having a central hub, an outer edge, and a filtering surface comprising:
   a drainage and support plate having an upper and a lower surface and formed with unobstructed and continuous slots passing through said plate from said upper surface to said lower surface and extending generally from the hub toward the outer edge of the filter segment, and increasing in cross-sectional area perpendicular to the radius with increasing distance from the hub so as to give substantially uniform flow through filtering media adjacent thereto, upper and lower filtering media above the upper surface and beneath the lower surface of the plate, respectively, and upper and lower means for acting in cooperation with the filter media to drain and support filtering media, and allow flow of a filtrate to the slots.

14. A filter segment as in claim 13 wherein the slots branch into a greater number of slots as they extend toward the outer edge.

15. A filter as in claim 13 wherein said cooperating means is a drainage mesh.

16. A filter segment for a segmented filter stack filtering unit with a central drainage channel, having a central hub, an outer edge and a filtering surface, comprising:

a drainage and support plate having an upper and a lower surface, a central orifice, an outer edge, and unobstructed and continuous slots having an inner and outer end, the inner slot ends being open to said central orifice and said slots extending continuously from the orifice toward the edge and increasing in cross-sectional area perpendicular to the radius with increasing distance from the hub so as to give substantially uniform flow through filtering media adjacent thereto, an upper and a lower drainage mesh with inner and outer sides and with inner sides adjacent to said upper and lower surfaces of the plate, respectively, and an upper and a lower filtering medium adjacent the outer side of the upper and lower drainage mesh, respectively.

17. A filter segment as in claim 16, further comprising:

a first sealing means for sealing said upper and lower filtering media together at the outer edge, and a second sealing means for sealing each of said upper and lower filtering media to the hub.

18. The filter segment of claim 16, in which said upper and lower filtering media each comprise an inner and outer layer, said inner layer more proximate to said drainage and support plate than said outer layer, said inner layer comprising a porous metal membrane and said outer layer comprising a porous metal fiber material.

19. The filter segment of claim 16, in which said upper and lower filtering media each comprise a porous ceramic material.

20. A filter segment as in claim 16 wherein the slot centerlines are straight in plan form and the width is increased with radial distance from the hub so as to provide substantially uniform flow through the filtering media.

21. A filter segment as in claim 16 wherein the slot centerlines are arcuate in plan form.

22. A filter segment as in claim 16 wherein the slots branch into a greater number of slots as they extend toward the outer edge.

23. The filter segment of claim 16 in which the local radius and width of each slot varies with the distance from the central orifice in such a manner that the total area of the slots in the plane of the plate is in a constant proportion to the filter surface area for any portion of the plate.

24. The filter segment of claim 16 in which the local radius and width of each slot varies with the distance from the central orifice in such a manner that a substantially uniform pressure differential is maintained over the filtering media when a fluid is filtered by the filtering unit.

25. The filter segment of claim 16 in which the local radius and width of each slot varies with the distance from the central orifice in such a manner that a substantially uniform flow velocity is maintained over the filtering surface when a fluid is filtered by the filtering unit.

26. A filter segment of a segment filter unit for filtering a fluid, said filter segment having a central hub, an outer edge, and filtering surface comprising:

a drainage and support plate having an upper and a lower surface and formed with unobstructed and continuous slots passing through said plate from said upper surface to said lower surface and extending generally from the hub toward the outer edge of the filter segment, and increasing in cross-sectional area perpendicular to the radius with increasing distance from the hub so as to give substantially uniform flow through filtering media adjacent thereto, upper and lower filtering media above the upper surface and beneath the lower surface of the plate, respectively, and upper and lower means for acting in cooperation with the slotted support plate to drain and support the filtering media, and allow flow of a filtrate to the slots, each of said slots having a centerline and a width distribution along said centerline, the configuration of said centerline and the width distribution along said centerline being optimized to provide substantially uniform flow through said filtering media.

* * * * *